(12) United States Patent
Armbruster (10) Patent No.: US 10,850,437 B2
(45) Date of Patent: Dec. 1, 2020

(54) DEVICE FOR PRODUCING A PRODUCT BY MEANS OF INJECTION MOLDING, AND METHOD

(71) Applicant: FOBOHA (GERMANY) GMBH, Haslach (DE)

(72) Inventor: Rainer Armbruster, Wolfach (DE)

(73) Assignee: FOBOHA (GERMANY) GMBH, Haslach (DE)

( * ) Notice: Subject to any disclaimer, the term of this patent is extended or adjusted under 35 U.S.C. 154(b) by 317 days.

(21) Appl. No.: 15/772,312

(22) PCT Filed: Oct. 28, 2016

(86) PCT No.: PCT/EP2016/076053
§ 371 (c)(1),
(2) Date: Jul. 23, 2018

(87) PCT Pub. No.: WO2017/072287
PCT Pub. Date: May 4, 2017

(65) Prior Publication Data
US 2018/0319059 A1    Nov. 8, 2018

(30) Foreign Application Priority Data
Oct. 29, 2015   (CH) ....................................... 1577/15

(51) Int. Cl.
*B29C 45/04*   (2006.01)
*B29C 33/00*   (2006.01)
(Continued)

(52) U.S. Cl.
CPC ........ *B29C 45/045* (2013.01); *B29C 33/0083* (2013.01); *B29C 49/06* (2013.01);
(Continued)

(58) Field of Classification Search
CPC .............. B29C 45/045; B29C 45/7207; B29C 2049/023; B29C 49/062; B29C 33/0083
See application file for complete search history.

(56) References Cited

U.S. PATENT DOCUMENTS

| | | | | |
|---|---|---|---|---|
| 4,315,725 A | * | 2/1982 | Yoshino | .................. B29C 49/58 |
| | | | | 219/388 |
| 4,427,359 A | | 1/1984 | Fukuoka | |

(Continued)

FOREIGN PATENT DOCUMENTS

| | | | | |
|---|---|---|---|---|
| CA | 2806503 A1 | * | 3/2012 | ......... B29C 45/1774 |
| DE | 1 933 484 A1 | | 2/1971 | |

(Continued)

OTHER PUBLICATIONS

Partial machine translation of EP 1970192 A2 dated Sep. 2008 obtained from the espace website. (Year: 2008).*

(Continued)

*Primary Examiner* — Robert B Davis
(74) *Attorney, Agent, or Firm* — Pauley Erickson & Swanson (57) ABSTRACT

The invention relates to a molding device for producing a product by means of injection molding. The molding device comprises a central mold part, which can be rotated about a rotational axis and which comprises at least one inner mold half arranged on the central mold part, and at least one outer mold half, which interacts with the inner mold half in order to form cavities in a closed configuration of the molding device and which is arranged in a movable manner relative to the inner mold half in a first direction (x). Furthermore, at least one first connector element arranged on the central mold part and at least one second connector element arranged on the outer mold half are provided, said second connector element being operatively connected to the first connector element at least in a closed configuration of the molding device.

43 Claims, 3 Drawing Sheets

(51) Int. Cl.
  *B29C 49/06*   (2006.01)
  *B29C 45/72*   (2006.01)
  *B29C 49/08*   (2006.01)
  *B29C 49/02*   (2006.01)

(52) U.S. Cl.
  CPC ........ *B29C 49/062* (2013.01); *B29C 45/7207* (2013.01); *B29C 49/08* (2013.01); *B29C 2049/023* (2013.01)

(56) References Cited

U.S. PATENT DOCUMENTS

| | | | |
|---|---|---|---|
| 5,090,889 | A | 2/1992 | Döber et al. |
| 7,108,501 | B2 * | 9/2006 | Araujo ................. B29C 49/063 425/529 |
| 2010/0078861 | A1 * | 4/2010 | Herklotz ............. B29C 49/4236 264/532 |

FOREIGN PATENT DOCUMENTS

| | | | | |
|---|---|---|---|---|
| DE | 24 44 465 | A1 | 3/1976 | |
| EP | 1970192 | A2 * | 9/2008 | ............... B30B 7/02 |
| WO | WO 02/04186 | A1 | 1/2002 | |
| WO | WO 2012/025556 | A1 | 3/2012 | |

OTHER PUBLICATIONS

EPO (Riswijk, NL), English language version of the International Search Report, Form PCT/ISA/210, for International Application PCT/EP2016/076053, dated Dec. 5, 2016 (2 pages).

Golfang Ltd, https://www.youtube.com/watch?v=N3oOk56rjB8, "3-Cavity 700ml Sports Bottle by GF-IB Machine," Published Nov. 17, 2010 (1 page).

Golfang Ltd, https://www.youtube.com/watch?v=sSY7wdixwCQ, "Single-Stage Injection Blow Molding Machine (Product: Yogurt Bottles)," Published Aug. 18, 2010 (1 page).

* cited by examiner

DEVICE FOR PRODUCING A PRODUCT BY MEANS OF INJECTION MOLDING, AND METHOD

BACKGROUND OF THE INVENTION

Field of the Invention

The present invention relates to the field of devices for producing hollow products made of plastic by means of injection molding and blow molding.

Discussion of Related Art

When manufacturing products out of plastic, e.g. by means of injection molding or blow molding, the mold and the operation of the mold represent a decisive expense item. In particular, it is desirable to achieve the shortest possible cycle time in order to increase the production efficiency.

A variety of molding devices with rotatable mold middle parts are known from the prior art. The mold middle part, which is able to rotate around a rotation axis, is generally supported between two outer mold halves that are able to move along an axis of an injection molding machine; the outer mold halves cooperate with side surfaces of the mold middle part in order to form cavities. The use of the rotatable mold middle part makes it possible to achieve a significant increase in the production efficiency with a simultaneously space-saving design.

In production processes that include a form of blow molding, e.g. injection blow molding or stretch blow molding, the suitable heating of the preforms (parisons) before the blowing takes up a significant portion of a cycle. As a rule, the preforms are heated to the required temperature in a separate heating station, e.g. by means of infrared radiation, before the heated preforms are blown into the desired shape in a blow molding station. This separate use of a heating station and a blow molding station, however, extends the cycle time and limits the ability to increase efficiency.

U.S. Pat. No. 4,427,359 from the company Sumitomo Heavy Industries, Ltd. discloses an injection-stretch blow molding machine with an injection mold and a stretch/blow mold, including four sub-molds, which form a part of the injection mold and can hold the neck of the preforms as they are being transported. They are arranged at 90° intervals on a rotating body. The rotating body is able to rotate in such a way that the sub-molds can be successively brought into an injection molding position, a heating position, a blowing position, and a discharge position, which are arranged at 90° intervals around a stationary, i.e. nonrotatable middle part.

DE2444465 from the Ilikon Corp. discloses an injection molding device composed of a square turntable on the outsides of which a plurality of mandrels are mounted for forming a briquette and a multilayer briquette. In a conditioning station, the mandrel can be heated, either through circulation of a hot medium in the conduits of the mandrel, through high-frequency induction heating of the mandrel using an outer coil, or through dielectric heating using a high frequency.

U.S. Pat. No. 5,090,889 by Systec Engineering Knauer GmbH & Co. KG discloses an injection blow mold having a casting matrix with a plurality of casting molds and having an associated molding plug that is movable relative to the casting molds and has mold cores corresponding to the plurality of casting molds, in which the molding plug with the mold cores is embodied as a rotating body, which is supported so that it is able to rotate by a rotation angle of at least 90°, in particular 2×90°, on a support that is able to move relative to the casting matrix and is arranged between the casting matrix and a likewise movable blow matrix so that mold cores arranged on one side of the rotating body are simultaneously inserted into casting molds of the casting matrix and mold cores arranged on the opposite side of the rotating body are simultaneously inserted into blowing molds of the blowing matrix, and permit an injection casting process step and a blowing process step to be performed simultaneously. Heating coils can be installed for electrically heating the mold core.

DE1933484 by the inventors Dieter and Rolf vom Hofe discloses an injection blow mold with a nozzle mold plate and a counterpart mold plate that is able to move back and forth in a closing direction, between which are positioned at least one injection molding chamber and a blow molding chamber that is composed of blow mold halves and is divided perpendicular to the closing direction, and with a support head that is rotatable in the closing direction, the support head having two blow molding cores that form a pair and are able to rotate back and forth by an angle of 90° around a vertical axis perpendicular to the closing direction. In each end position of the support head, the one blow molding core is positioned in the injection molding chamber and the other blow molding core is positioned in one of the two blow molding chambers. The pivoting back and forth of the support head produces a connection for the different working mediums because flexible lines can be used for the working mediums. Rotary connections are not required. In the injection molding chamber, the blank is molded on the heated blow molding core and is transferred into the blow molding chamber on the heated blow molding core.

The "3-Cavity 700 ml Sports Bottle by GF-I B Machine" made by the company Golfang Ltd. at https://www.youtube.com/watch?v=N3oOk56rjB8 shows an injection molding machine with a middle part that rotates back and forth, on which three respective cores are positioned on each of two opposing side surfaces. The middle part is supported between two outer mold halves, with matrixes associated with the cores, so that it is able to move in a longitudinal direction of the injection molding machine; a first of the outer mold halves is stationary and the second outer mold half is movable in the longitudinal direction of the injection molding machine. In the stationary outer mold half, preforms are injected onto the cores of a side surface. Through a rotation of the middle part by 180°, the cores with the injected preforms can be brought into the position of the second outer mold half in which they are blow molded. After the ejection of the blow molded parts, a reverse rotation of the middle part by −180° brings the cores back into the starting position for the injection. Between the injection molding and blow molding procedures, the middle part is thus pivoted by 180° and not pivoted endlessly around a vertical axis. The middle part is thus fastened so that it is suspended on its holding device and is not operatively connected to the cross beams of the injection molding machine.

The "Single-Stage Injection Blow Molding Machine" made by the company Golfang Ltd. at https://www.youtube.com/watch?v=sSY7wdixwCO likewise shows an injection molding machine in which a rotatable middle part between two outer mold halves is pivoted back and forth by 180° around a vertical axis between injection molding and blow molding procedures. For the movement along a longitudinal direction of the injection molding machine, the rotatable middle part is guided on cross beams.

SUMMARY OF THE INVENTION

One object of the invention is to disclose a device for producing hollow products out of plastic, which has a significantly better efficiency and a simpler design than the devices that are known from the prior art.

This object is attained according to the invention by means of a molding device and a method according to the independent claims.

One embodiment of the molding device according to the invention for producing a product out of plastic by means of injection molding, blow molding, injection blow molding, or stretch blow molding includes at least one mold middle part, which is able to rotate and which typically has two or four side surfaces that are situated opposite one another relative to the rotation axis, on which inner mold halves are positioned and at least one outer mold half that cooperates with an inner mold half to form cavities in a closed position of the molding device.

As a rule, the mold middle part with the inner mold halves is positioned between two outer mold halves, which in a closed position can cooperate with the inner mold halves to form cavities; preferably, the outer mold halves can be moved in linear fashion along an axis of the molding device. Through a linear movement of the outer mold halves toward the mold middle part or away from the mold middle part, the molding device can be closed (closed position) or opened (open position). The open position is selected so that the mold middle part can rotate unhindered around its rotation axis.

As a rule, for each inner mold half, there is at least one first connector element, which is positioned so that it rotates along with the mold middle part and in a closed position of the molding device, cooperates with or can be operatively connected to at least one second connector element that does not rotate along with the mold middle part, e.g. in order to supply power and/or transmit data. The at least one second connector element can be positioned, for example, on a holding device of the rotatable mold middle part and/or on one of the outer mold halves and/or on a mold mounting plate and/or on a machine bed.

The connector elements that are to be connected can be positioned so that they are operatively connected to each other by the closing movement of the molding device. Alternatively or in addition, a device (drive) can be provided by means of which the operative connection is triggered by the movement of the mold middle part or of the mold halves.

For example, in order to produce the operative connection, a first connector element can be supported so that it can be moved relative to a second connector element in an operative connection direction by means of a drive. Good results can be achieved with a linear drive. Depending on the design and application field, the drive can be positioned on the rotatable mold middle part and/or on one of the outer mold halves and/or on a mold mounting plate and/or on a machine bed and/or on a holding device for the rotatable mold middle part.

The first and second connector elements can be used for transmitting relatively high alternating currents and/or direct currents, e.g. as an energy supply for heating or cooling elements or actuators or a combination thereof. Especially with a mold middle part that can be endlessly rotated around an axis, the contacting represents a particular challenge because of the rotary motion. Because of the rotary motion, it is often not possible to use conventional cabling; otherwise such cabling hinders the rotary motion.

This makes it possible to supply power to the mold middle part or the inner mold half in an intermittent fashion. The mold middle part or the components to be contacted can be electrically insulated in the open configuration of the molding device. This is advantageous since most of the components of the rotatable mold middle part that are to be contacted, for example heating elements or pressure sensors, most often only have to be electrically operated in the closed position of the molding device. The connector arrangement according to the invention with the first and second connector element has the advantage that cabling problems due to rotary motions can be avoided.

Contacts known from the prior art, however, which extend across the rotation axis of the mold middle part, must absorb the rotating movements of the mold middle part, which can lead to fatigue problems.

The connector arrangement according to the invention is flexible in that it can be integrated without much trouble into existing molding devices with a rotatable mold middle part since the cabling and the connector elements can be mounted on the mold middle part or on the outer mold halves in a simple way without having to significantly alter their design.

In one embodiment, the mold middle part can be rotated endlessly around a rotation axis. The arrangement of connector elements according to the invention offers the advantage that for the electrical contacting, there are no limitations to the rotation angle or rotation direction of the mold middle part since the power supply is decoupled from the rotary motion of the mold middle part. Another advantage lies in the fact that a selective triggering is possible since the connector elements can be arranged so that only the respective regions that are currently active are supplied with energy, for example.

In one embodiment, the at least one first connector element is electrically connected to heating elements that are positioned on the mold middle part and/or the inner mold half. Heating elements are particularly important for blow molding processes because before the blowing procedure, the preforms have to be heated to a temperature that is suitable for blowing. By contrast with the prior art, one or more heating elements can be operatively connected to or integrated into cores positioned on the mold middle part. To this end, the cores can have a groove into which a heating wire is inserted. The heating of the cores can be carried out by means of resistance heating elements or by means of inductive heating elements, which permit a particularly rapid heating.

Alternatively or in addition, two connector elements can be inductively coupled to each other. This has the advantage that for example the heating elements can be supplied with power in a cordless fashion.

As a rule, cores are positioned on the inner mold halves and matrixes or cavities that are embodied to correspond to the cores are positioned on the outer mold halves. In one embodiment, the inner mold half comprises blow molding cores on which or in which the heating elements are positioned. It is thus possible for preforms adhering to the blow molding cores to be heated by means of the blow molding cores before the blowing. A heating by means of the blow molding cores is advantageous because the thermal coupling between the blow molding cores and preforms is comparatively high and therefore—e.g. in comparison to a conventional heating station in which the preforms are heated from the outside by means of infrared radiation—enables a more efficient heating performance and as a result, less energy is required. The increased heating performance permits the cycle time to be further reduced since the preforms can achieve the temperature that is desired for blow molding in a shorter period of time. Another advantage lies in the fact that the preforms can be blown immediately after the heating, without having to move the inner mold halves. This obviates the need for a separate heating station. Through the elimination of a separate heating station, an additional side surface of the rotatable mold middle part—which in the prior art was usually provided for the heating process—can be freed and used for another processing step. Such a use of the additionally freed side surface can, for example, be used to produce multi-component products or to increase the output, as explained further below. Another advantage of the heating and blowing on the same side surface is that the preforms do not have to be overheated, which is often the case in conventional blow molding devices since the preforms can cool during the movement from the heating station to the blowing station.

Alternatively or in addition to this, the at least one first connector element can be electrically connected to sensors positioned on the mold middle part and/or on the inner mold half, preferably pressure and/or temperature sensors. Alternatively or in addition to this, the at least one first connector element can be electrically connected to cooling elements positioned on the mold middle part and/or on the inner mold half.

Preferably, the at least one first connector element and the at least one second connector element are electrical plug connector elements. If necessary, the plug connector elements have movably positioned connector pins and correspondingly embodied connector sockets. The connector pins and the connector sockets advantageously have a cross-section that tapers at least in some regions, which facilitates plugging. In a preferred embodiment, the connector pins and the connector sockets that are compatible thereto are embodied as conical so that they can be easily plugged into each other. The connector pins and the associated connector sockets can be positioned so that to a certain degree, they are movable relative to each other so that any positioning imprecisions can be compensated for. If necessary, the connector pins and/or the connector sockets can be positioned so that they can be deflected, for example, in opposition to the force of a spring. If necessary, one or more centering means can be provided, which serve to pre-center the connector elements during the plugging procedure. The centering means are advantageously positioned so that they engage with each other first, before the connector elements come into contact with each other.

As a rule, the switching of the currents that are transmitted by means of the connector elements does not occur by means of the connector elements, but rather by means of one or more switches. In other words, the connector elements are advantageously plugged in the currentless state and only afterwards is the electrical circuit closed by means of the at least one switch. The at least one switch is advantageously mounted on the side that is supported in a nonrotatable fashion. The switch can be activated by means of the mold movement. As a rule, the first connector element and second connector element are moved relative to each other before the energy is transmitted. This can take place by means of a separate drive, which is activated for this purpose and brings the first connector element into an operative connection with the second connector element by means of a relative movement of the two relative to each other.

In one embodiment, the molding device comprises three outer mold halves and the mold middle part comprises four side surfaces with four inner mold halves; a first and second outer mold half cooperate with a first and second inner mold half that are positioned on opposite side surfaces for the injection molding and a third outer mold half cooperates with a third inner mold half for the blow molding and the fourth side surface is used for cooling and for removal of the injection molded parts. This embodiment is particularly suitable for producing multi-component products. For example, in the cavities formed by the first outer mold half and the first inner mold half, a first component of the products can be molded from a first component by means of injection molding. After the molding device opens, these products with the first component can, through rotation of the mold middle part, be brought into the position of the fourth side surface for cooling. A further rotation brings the cooled products with the first component to the position of the second side surface, where a second component of the products can be molded from a second plastic by means of injection molding, it being possible for the second component to serve as a preform for the subsequent blow molding. Through a further rotation, these products can be brought into the position of the third side surface, where for example the second component (the preform) of the product can be molded by means of blow molding. In this position, the blow molding cores of the inner mold half can be heated to the temperature that is required for blow molding; the heating elements can be supplied with current in order to heat the blow molding cores through contact of the at least one first connector element with the at least one second connector element since in the configuration of the molding device that is closed for the blow molding, the first and second connector elements can be electrically connected.

Optionally, the at least one first connector element and the at least one second connector element can be positioned on centering means, which are positioned on the mold middle part or on the inner mold halves and on the outer mold halves. The positioning of the connector elements on the centering means is advantageous because a precise orientation of the inner mold halves and outer mold halves can be achieved by the centering means during the closing of the molding device and thus at the same time, an optimal orientation of the connector elements can be assured for the operative connection thereof.

The invention also relates to a method for producing a product with a molding device according to the present disclosure, characterized in that the mold middle part and/or the inner mold half is supplied with current when the molding device is in the closed configuration and the at least one first connector element and the at least one second connector element are operatively connected.

BRIEF DESCRIPTION OF SEVERAL VIEWS OF THE DRAWINGS

Aspects of the invention will be explained in greater detail below based on exemplary embodiments in connection with the figures. In the drawings.

DETAILED DESCRIPTION OF THE INVENTION

Figure 1:
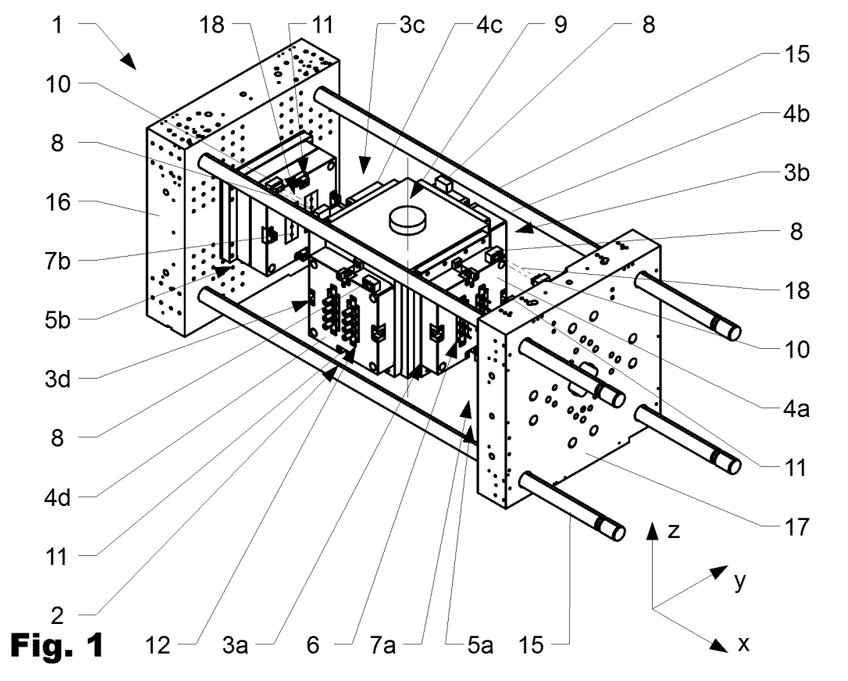
FIG. 1 shows a first embodiment of the molding device in a perspective view obliquely from above and to the right; the molding device is shown in the open configuration.
Figure 2:
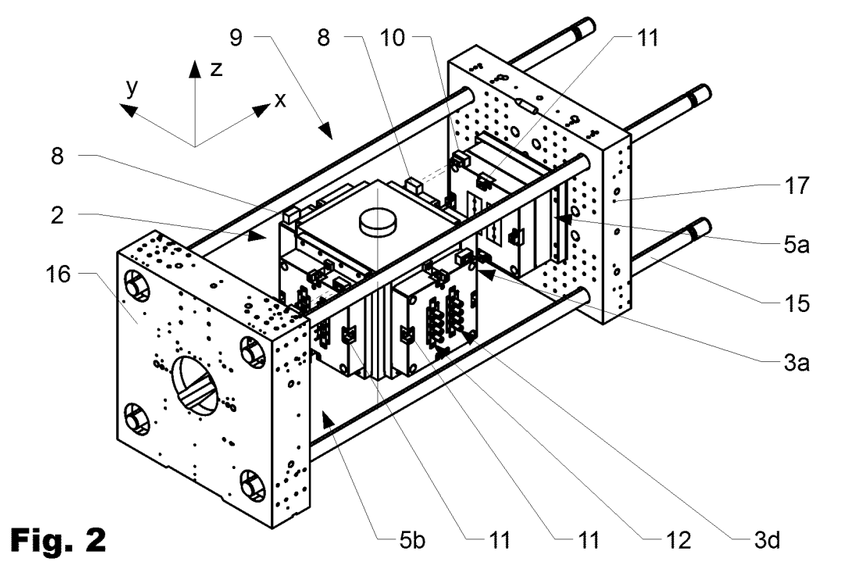
FIG. 2 shows the molding device from FIG. 1 in a view obliquely from above and to the left.

FIG. 1 shows a perspective view of an embodiment of a molding device 1 in an open configuration viewed obliquely from above and to the right. The molding device 1 comprises a mold middle part 2, which is rotatable around a rotation axis 9 (Z direction), with four inner mold halves 4a, 4b, 4c, 4d positioned on side surfaces 3a, 3b, 3c, 3d, and a first and second outer mold half 5a, 5b, which can be moved along cross beams 15 of an injection molding machine (not shown in detail) in the direction of an axis X relative to the mold middle part 2. Outwardly protruding cores 6 are positioned on the inner mold halves 4a-d. The cores 6 can, for example, be used to injection mold (injection molding cores) and/or to blow mold (blow molding cores) parts out of plastic. Other embodiments are possible.

The mold middle part 2 is supported relative to the cross beams 15 and/or a machine bed of the injection molding machine by means of a holding device, but this is not shown in detail here.

The outer mold halves 5a, 5b comprise correspondingly embodied first and second matrixes 7a, 7b, which are associated with the cores 6 and in a closed configuration (closed position, see FIGS. 3 and 4), cooperate with the latter to form cavities, which are used for molding the parts that are to be produced.

Figures 5, 6:
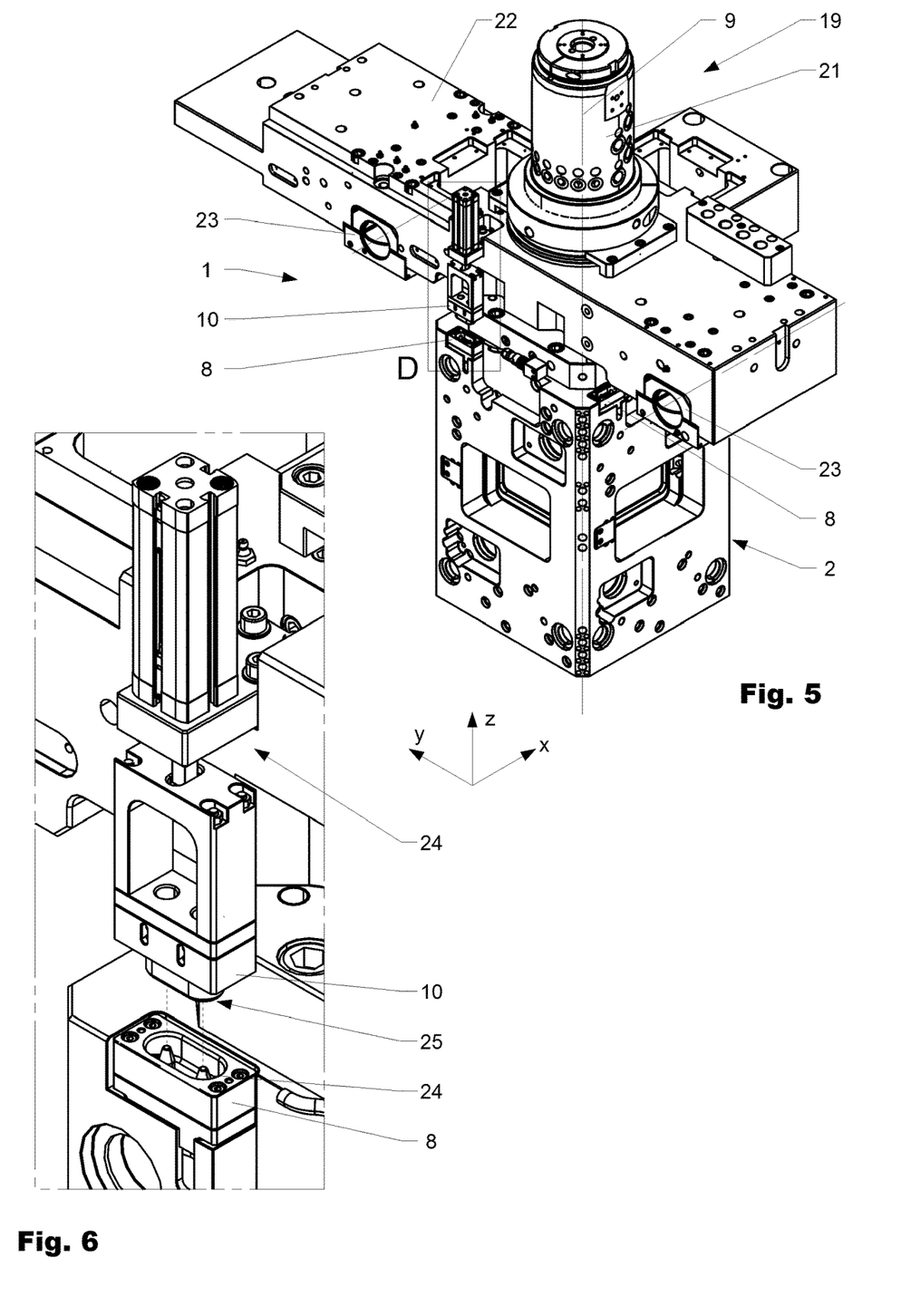
FIG. 5 shows a holding device with a rotatable mold middle part in a perspective view.
FIG. 6 shows detail D according to FIG. 5.

On the inner mold halves 4a-d, first connector elements 8 are positioned, which rotate along with a rotation of the mold middle part 2. Electrical lines (not shown in detail) extend from the first connector elements 8 to the cores 6. The cores 6 can, for example, comprise heating elements, which are contacted by means of the electrical lines. On the two outer mold halves 5a, 5b, which are positioned diametrically opposite the mold middle part 2 relative to the rotation axis 9, second connector elements 10 are positioned, which can be operatively connected to the first connector elements 8 during the closing of the molding device 1, which is schematically depicted here by means of the dotted lines 18. The second connector elements 10 move along with the outer mold halves 5a, 5b. Electrical lines extend outward from the second connector elements 10 to an external current source and to a control unit (not shown). In the embodiment shown, the connector elements 8, 10 are respectively positioned on the inner and outer mold halves 4a-4d, 5a, 5b. Depending on the embodiment and the application field, these can alternatively or additionally be positioned on the side and/or underneath and/or inside the operatively connected surfaces that come into contact with one another during closing. Another possibility lies in positioning the second connector elements 8 on a holding device for the rotatable mold middle part 2, as shown in FIGS. 5 and 6.

With a closed configuration of the molding device 1, the first connector elements 8 are as a rule operatively connected to the second connector elements 10 directly so as to ensure a selective power supply of the mold middle part 2 or a region thereof. For example, it is thus possible to supply energy to heating elements (not shown in detail), which are positioned in the cores 6 or are operatively connected to them and which serve to adjust the temperature of the cores 6. In a variant, the connector elements 8, 10 are not operatively connected at the same time as the closing of the molding device 1, but rather in a time-delayed fashion. To achieve this, the connector elements 8, 10 are supported in movable fashion at least on one side and can be moved by means of a corresponding mechanism. Alternatively or in addition to this, the connector elements 8, 10 can be positioned so that they already enter into the operative connection before the closing of the molding device 1 is completed. This can be achieved in that a first connector element is positioned so that it protrudes on at least one side so that during the closing of the molding device, it comes into contact with the associated second connector element first and then is deflected, e.g. in opposition to the force of a spring, until the molding device 1 has reached its final closed position. Alternatively or in addition to this, a second connector element 10 can be fastened to a holder for the rotatable mold middle part 2 and if necessary, can have its own movement drive to produce the operative connection with the first connector element 8.

As a rule, the connector elements 8, 10 are plugged into and unplugged from each other when the power supply is switched off so as to avoid any sparking. To accomplish this, the power supply or the actuator has a suitable switch element (both not shown in detail). As a rule, the mold middle part 2 and the inner mold halves 4a-4d are not supplied with power in the open configuration of the molding device 1. The depicted embodiment of the molding device 1 enables an intermittent supply of power to the mold middle part 2 and to the inner mold halves 4a-4d. In the embodiment shown, first connector elements are positioned on each side surface 3a-3d of the mold middle part 2. Alternatively, only a single first connector element 8 can be positioned on the mold middle part 2, welcher can ensure the power supply to all of the inner mold halves 4a-4d. In this case, the first connector element 8 would not be mounted in rotatable fashion.

In the embodiment shown, the outer mold halves 5a, 5b also comprise centering means 11, which serve to orient the inner mold halves 4a-4d and outer mold halves 5a, 5b relative to one another.

Figure 3:
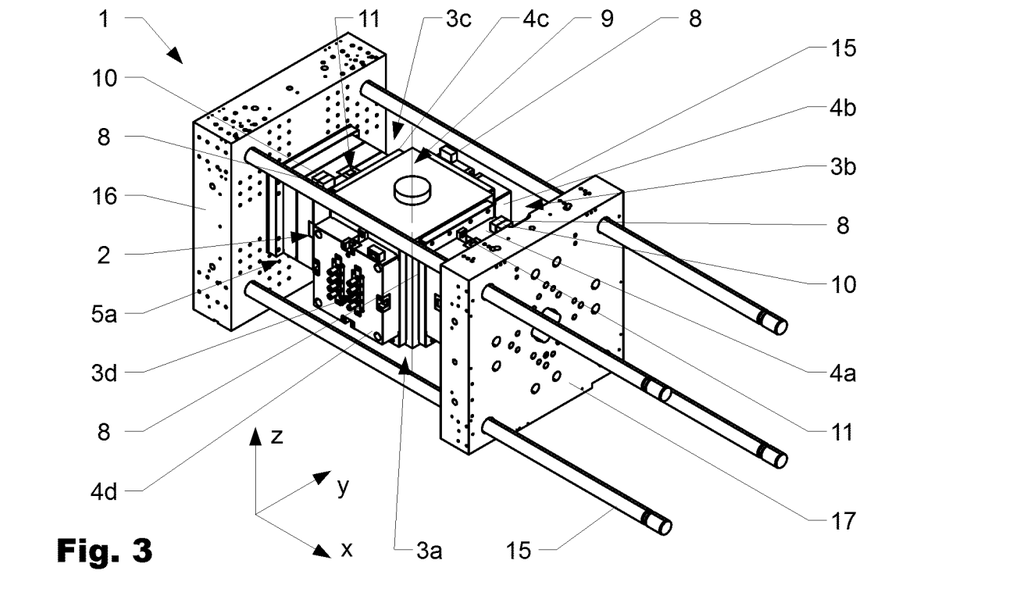
FIG. 3 shows the molding device from FIG. 1 in a perspective view obliquely from above and to the right; the molding device is shown in the closed configuration.
Figure 4:
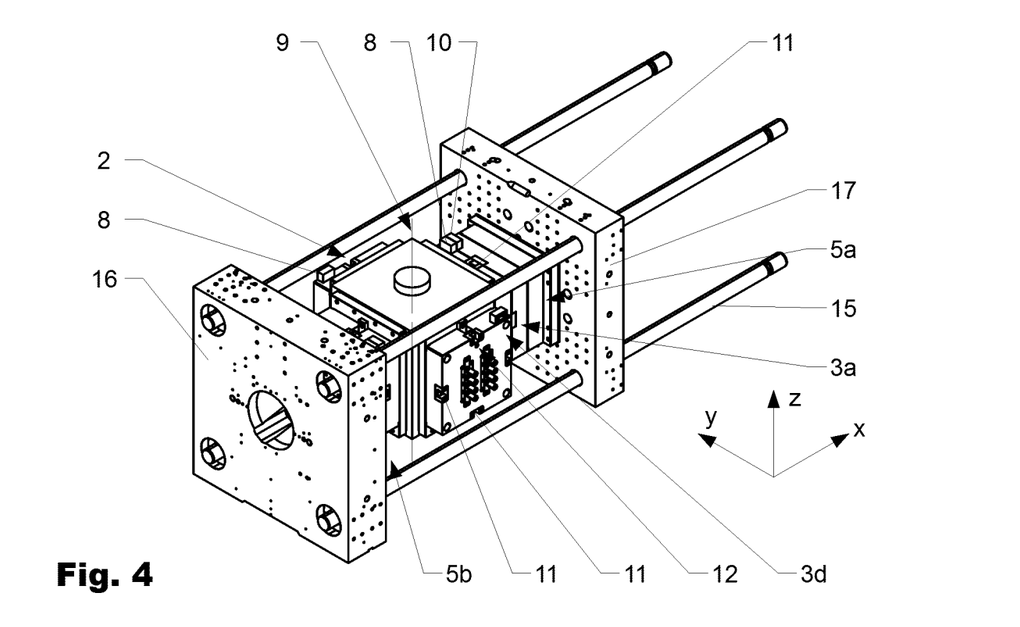
FIG. 4 shows the molding device from FIG. 2 in a view obliquely from above and to the left.

FIG. 3 shows the molding device 1 from FIG. 1 in a view obliquely from above and to the right; the molding device 1 is shown in a closed configuration (closed position). FIG. 4 shows the same molding device 1 viewed obliquely from above and to the left. In the embodiment shown, the side surfaces 3a and 3c, the inner mold halves 4a and 4c, and the outer mold halves 5a and 5c are used for injection molding. The side surface 3b, the inner mold halves 4b, and the outer mold half 5b can be used for another molding procedure—as described below.

In simplified terms, such a molding procedure can be constructed as follows: injection molding of a first component of the products with a first plastic in the cavities formed by the inner mold half 4a and the outer mold half 5a; rotation of the mold middle part 2 by 90° so that the injection molded products of the first component come to rest against the side surface 3d; cooling of the injection molded products of the first component against the side surface 3d; rotation of the mold middle part 2 by 90° so that the cooled products of the first component come to rest against the side surface 3c; formation of a second component of the products by means of injection molding with a second plastic, with the second component serving as a preform for the subsequent blow molding; rotation of the mold middle part 2 by 90° so that the products come to rest against the side surface 3b; heating of the cores to a temperature that is suitable for the blow molding; blow molding of the preforms.

FIG. 5 is a perspective depiction of a part of a holding device 19 and a mold middle part 2 that is supported so that it is able to rotate around the rotation axis 9 relative to the holding device 19. In the embodiment shown, the holding device 19 comprises a base 22, which is supported by means of bearing bushings 23 on two opposing cross beams 15 of a molding device 1 (see FIGS. 1 through 4). Instead of using cross beams 15, a base 22 can also be supported by means of guide rails on a machine bed of an injection molding machine (all not shown in detail). A rotating unit 21 is fastened to the base 22 and serves to support the mold middle part 2 so that it can rotate around the rotation axis 9. FIG. 6 shows an enlarged view of detail D from FIG. 5. For each active side surface, the rotatably supported mold middle part 2 has a first connector element 8, which rotates along with the mold middle part 2. A second connector element 10 is positioned on the holding device 19. In the embodiment shown, the second connector element 10 is mounted so that it can be moved by means of a drive 24 in the vertical direction (Z direction). The drive 24 is a linear drive, which is operatively connected to the base 22 and is pneumatically driven. It is possible to use other forms of drive. As soon as the rotatable mold middle part 2 has reached its rotation position that is required for the production step, the drive 24 is activated and the second connector element 10 is inserted from above into the first connector element 8 and is operatively connected to it. As is clear from FIG. 6, the first connector element 8 has an active surface 24 and the second connector element 10 has a correspondingly embodied counterpart surface 25, which surfaces come into contact with each other when the operative connection is produced and orient the connector elements relative to each other transversely to the plugging direction. The active surface 24 and/or the counterpart surface 25 are/is advantageously embodied as tapered, viewed in the plugging direction. If necessary, at least one of the connector elements 8, 10 is positioned so that it can be deflected in opposition to the force of a spring. One advantage of the depicted embodiment of the invention lies in the fact that it is simple in design, accessible from the outside, and thus easy to maintain. By contrast with approaches that are based on slip rings for energy transmission, no height is lost. Furthermore, it is possible to transmit currents of almost any strength.

LIST OF REFERENCE NUMERALS 1 molding device
2 mold middle part
3a-3d side surfaces
4a-4d inner mold halves
5a, 5b outer mold halves
6 core
7a, 7b matrixes
8 first connector elements
9 rotation axis
10 second connector elements
11 centering means
12 product
15 cross beam
16 first mold mounting plate (stationary)
17 second mold mounting plate (movable)
18 plugging procedure (schematically depicted)
19 holding device (mold middle part)
20 cross beam (holding device)
21 rotating unit (holding device)
22 base
23 bearing bushing
24 drive
25 active surface
26 counterpart surface

The invention claimed is:

1. A molding device (1) for producing a product (12) by means of injection molding, comprising:
   a. a mold middle part (2) that is rotatable around a rotation axis (9), with at least one inner mold half (4a-4d) positioned on the mold middle part (2);
   b. at least one outer mold half (5a, 5b), which cooperates with the inner mold half (4a-4d) to form cavities in a closed configuration of the molding device (1) and is positioned so that it is able to move relative to the inner mold half (4a-4d) in a first direction (X), wherein the molding device comprises four outer mold halves and the mold middle part (2) comprises four side surfaces with four inner mold halves (4a-4d); a first and second outer mold half (5a, 5b) cooperate with first and second inner mold halves (4a-4d) positioned on opposite side surfaces (3a-3d) for the injection molding and a third and fourth outer mold half (5a, 5b) cooperate with third and fourth mold halves positioned on opposite side surfaces (3a-3d) for the blow molding;
   c. at least one first connector element (8) that is positioned on the mold middle part (2);
   d. at least one second connector element (10); wherein
   e. the second connector element (10) is fastened to a region of the molding device (1) that does not rotate along with the mold middle part (2) and
   f. is operatively connected to the first connector element (8) at least in a closed configuration of the molding device (1).

2. The molding device (1) according to claim 1, wherein the at least one second connector element (10) is positioned on the holding device (19) of the rotatable mold middle part (2) and/or on one of the outer mold halves (5a, 5b) and/or on a mold mounting plate (16, 17) and/or on a machine bed.

3. The molding device (1) according to claim 2, wherein in order to produce the operative connection, a first connector element (8) is supported so that it can be moved in an operative connection direction (z) relative to a second connector element (10).

4. The molding device (1) according to claim 3, wherein the first connector element (8) is moved relative to the second connector element (10) with a drive (24).

5. The molding device (1) according to claim 4, wherein the drive (24) is a linear drive.

6. The molding device (1) according to claim 4, wherein the drive (24) is positioned on the rotatable mold middle part (2) and/or on one of the outer mold halves (5a, 5b) and/or on a mold mounting plate (16, 17) and/or on a machine bed.

7. The molding device (1) according to claim 1, wherein the at least one first connector element (8) is electrically connected to at least one heating element that is positioned on the mold middle part (2) and/or on the inner mold half (4a-4d).

8. The molding device (1) according to claim 7, wherein the at least one heating element is operatively connected to a core (6).

9. The molding device (1) according to claim 7, wherein the at least one heating element comprises an inductive heating element.

10. The molding device (1) according to claim 5, wherein the at least one second connector element (10) can be inductively coupled to at least one heating element.

11. The molding device (1) according to claim 7, wherein the inner mold half comprises at least one blow molding core (6), on which or in which a heating element is positioned.

12. The molding device (1) according to claim 1, wherein the at least one first connector element (8) and the at least one second connector element (10) are electrical plug connector elements.

13. The molding device (1) according to claim 1, wherein the at least one first connector element (8) is electrically connected to a drive of a stretching die for the stretch blow molding.

14. The molding device (1) according to claim 1, wherein the molding device (1) comprises three outer mold halves and the mold middle part (2) comprises four side surfaces with four inner mold halves (4a-4d); a first and second outer mold half (5a, 5b) cooperate with first and second mold halves (4a-4d) positioned on opposing side surfaces for the injection molding and a third outer mold half cooperates with a third inner mold half (4a-4d) for the blow molding.

15. The molding device (1) according to claim 1, wherein the at least one first connector element (8) and the at least one second connector element (10) are positioned on centering means, which are positioned on the mold middle part (2) or on the inner mold halves (4a-4d) and outer mold halves (5a, 5b).

16. The molding device (1) according to claim 1, wherein the at least one first connector element (8) includes at least one active surface (25) and the second connector element (10) includes a correspondingly embodied counterpart surface (26), which surfaces come into contact with each other when the operative connection is produced and orient the connector elements relative to each other transversely to the plugging direction.

17. The molding device (1) according to claim 16, wherein the active surface (25) and/or the counterpart surface (26) is/are embodied as tapered, viewed in the plugging direction.

18. The molding device (1) according to claim 1, wherein at least one connector element (8, 10) is supported in movable fashion.

19. The molding device (1) according to claim 18, wherein at least one connector element (8, 10) is supported so that it can be deflected in opposition to the force of a spring.

20. A method for producing a product with a molding device (1) according to claim 1, wherein the mold middle part (2) and/or the inner mold half (4a-5d) is/are supplied with current when the molding device (1) is in the closed configuration and the at least one first connector element (8) and the at least one second connector element (10) are operatively connected.

21. The method according to claim 20, wherein the first and second connector elements (8, 10) are moved relative to each other before energy is transmitted.

22. The method according to claim 21, wherein a drive (24) is activated, which brings the first connector element (8) into an operative connection with the second connector element (10) by moving the two relative to each other.

23. A molding device (1) for producing a product (12) by means of injection molding, comprising:
    a. a mold middle part (2) that is rotatable around a rotation axis (9), with at least one inner mold half (4a-4d) positioned on the mold middle part (2);
    b. at least one outer mold half (5a, 5b), which cooperates with the inner mold half (4a-4d) to form cavities in a closed configuration of the molding device (1) and is positioned so that it is able to move relative to the inner mold half (4a-4d) in a first direction (X);
    c. at least one first connector element (8) that is positioned on the mold middle part (2);
    d. at least one second connector element (10); wherein
    e. the second connector element (10) is fastened to a region of the molding device (1) that does not rotate along with the mold middle part (2) and
    f. is operatively connected to the first connector element (8) at least in a closed configuration of the molding device (1), wherein at least one connector element (8, 10) is supported in movable fashion and is supported so that it can be deflected in opposition to the force of a spring.

24. The molding device (1) according to claim 23, wherein the at least one second connector element (10) is positioned on the holding device (19) of the rotatable mold middle part (2) and/or on one of the outer mold halves (5a, 5b) and/or on a mold mounting plate (16, 17) and/or on a machine bed.

25. The molding device (1) according to claim 24, wherein in order to produce the operative connection, a first connector element (8) is supported so that it can be moved in an operative connection direction (z) relative to a second connector element (10).

26. The molding device (1) according to claim 25, wherein the first connector element (8) is moved relative to the second connector element (10) with a drive (24).

27. The molding device (1) according to claim 26, wherein the drive (24) is a linear drive.

28. The molding device (1) according to claim 26, wherein the drive (24) is positioned on the rotatable mold middle part (2) and/or on one of the outer mold halves (5a, 5b) and/or on a mold mounting plate (16, 17) and/or on a machine bed.

29. The molding device (1) according to claim 23, wherein the at least one first connector element (8) is electrically connected to at least one heating element that is positioned on the mold middle part (2) and/or on the inner mold half (4a-4d).

30. The molding device (1) according to claim 29, wherein the at least one heating element is operatively connected to a core (6).

31. The molding device (1) according to claim 29, wherein the at least one heating element comprises an inductive heating element.

32. The molding device (1) according to claim 27, wherein the at least one second connector element (10) can be inductively coupled to at least one heating element.

33. The molding device (1) according to claim 29, wherein the inner mold half comprises at least one blow molding core (6), on which or in which a heating element is positioned.

34. The molding device (1) according to claim 23, wherein the at least one first connector element (8) and the at least one second connector element (10) are electrical plug connector elements.

35. The molding device (1) according to claim 23, wherein the at least one first connector element (8) is electrically connected to a drive of a stretching die for the stretch blow molding.

36. The molding device (1) according to claim 23, wherein the molding device (1) comprises three outer mold halves and the mold middle part (2) comprises four side surfaces with four inner mold halves (4a-4d); a first and second outer mold half (5a, 5b) cooperate with first and second mold halves (4a-4d) positioned on opposing side surfaces for the injection molding and a third outer mold half cooperates with a third inner mold half (4a-4d) for the blow molding.

37. The molding device (1) according to claim 23, wherein the molding device comprises four outer mold halves and the mold middle part (2) comprises four side surfaces with four inner mold halves (4a-4d); a first and second outer mold half (5a, 5b) cooperate with first and second inner mold halves (4a-4d) positioned on opposite side surfaces (3a-3d) for the injection molding and a third and fourth outer mold half (5a, 5b) cooperate with third and fourth mold halves positioned on opposite side surfaces (3a-3d) for the blow molding.

38. The molding device (1) according to claim 23, wherein the at least one first connector element (8) and the at least one second connector element (10) are positioned on centering means, which are positioned on the mold middle part (2) or on the inner mold halves (4a-4d) and outer mold halves (5a, 5b).

39. The molding device (1) according to claim 23, wherein the at least one first connector element (8) includes at least one active surface (25) and the second connector element (10) includes a correspondingly embodied counterpart surface (26), which surfaces come into contact with each other when the operative connection is produced and orient the connector elements relative to each other transversely to the plugging direction.

40. The molding device (1) according to claim 39, wherein the active surface (25) and/or the counterpart surface (26) is/are embodied as tapered, viewed in the plugging direction.

41. A method for producing a product with a molding device (1) according to claim 23, wherein the mold middle part (2) and/or the inner mold half (4a-5d) is/are supplied with current when the molding device (1) is in the closed configuration and the at least one first connector element (8) and the at least one second connector element (10) are operatively connected.

42. The method according to claim 41, wherein the first and second connector elements (8, 10) are moved relative to each other before energy is transmitted.

43. The method according to claim 42, wherein a drive (24) is activated, which brings the first connector element (8) into an operative connection with the second connector element (10) by moving the two relative to each other.

* * * * *